US011469471B1

(12) United States Patent
Miler et al.

(10) Patent No.: US 11,469,471 B1
(45) Date of Patent: Oct. 11, 2022

(54) BATTERY PACK HEAT DISPENSING SYSTEMS

(71) Applicant: Apple Inc., Cupertino, CA (US)

(72) Inventors: Josef L. Miler, San Francisco, CA (US); Luke A. Wilhelm, Sausalito, CA (US); Edward T. Hillstrom, San Jose, CA (US); Dirk E. Long, Denver, CO (US); Russell A. McLellan, Coquitlam (CA); Yu-Hung Li, Sunnyvale, CA (US); Maria N. Luckyanova, San Francisco, CA (US); Evan D. Maley, Sunnyvale, CA (US); Edward T. Sweet, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 312 days.

(21) Appl. No.: 16/263,907

(22) Filed: Jan. 31, 2019

Related U.S. Application Data

(60) Provisional application No. 62/625,579, filed on Feb. 2, 2018.

(51) Int. Cl.
*H01M 50/24* (2021.01)
*H01M 10/658* (2014.01)
(Continued)

(52) U.S. Cl.
CPC ......... *H01M 50/24* (2021.01); *H01M 10/617* (2015.04); *H01M 10/623* (2015.04); *H01M 10/658* (2015.04); *H01M 50/209* (2021.01)

(58) Field of Classification Search
CPC .. H01M 50/24; H01M 2/1061; H01M 2/1094; H01M 10/658; H01M 10/617
See application file for complete search history.

(56) References Cited

U.S. PATENT DOCUMENTS

| 3,053,435 | A | 9/1962 | Sanders et al. |
| 6,278,259 | B1 | 8/2001 | Kimoto et al. |

(Continued)

FOREIGN PATENT DOCUMENTS

| CN | 2601463 Y | 1/2004 |
| CN | 101326657 A | 12/2008 |

(Continued)

OTHER PUBLICATIONS

U.S. Appl. No. 15/885,126, "Non-Final Office Action", dated Jan. 6, 2020, 20 pages.

(Continued)

*Primary Examiner* — Jonathan G Jelsma
(74) *Attorney, Agent, or Firm* — Kilpatrick Townsend and Stockton, LLP (57) ABSTRACT

Battery packs according to some embodiments of the present technology may include a first longitudinal beam and a second longitudinal beam. The battery packs may include a plurality of cell blocks disposed between the first longitudinal beam and the second longitudinal beam. The plurality of cell blocks may include first and second cell blocks each characterized by a first side surface proximate the first longitudinal beam, a second side surface, a third side surface proximate the second longitudinal beam, and a fourth side surface. The battery packs may include a first interface material thermally coupling the first side surface of the first cell block with the first longitudinal beam. The battery packs may also include a second interface material thermally coupling the third side surface of the second cell block with the second longitudinal beam.

7 Claims, 5 Drawing Sheets

(51) Int. Cl.
   *H01M 10/623* (2014.01)
   *H01M 10/617* (2014.01)
   *H01M 50/209* (2021.01)

(56) References Cited

U.S. PATENT DOCUMENTS

| | | | |
|---|---|---|---|
| 8,956,747 | B2 | 2/2015 | Itoi et al. |
| 10,923,788 | B1 | 2/2021 | Loveness et al. |
| 11,296,380 | B2 | 4/2022 | Miler et al. |
| 11,296,381 | B2 | 4/2022 | Miler et al. |
| 2004/0069474 | A1 | 4/2004 | Wu et al. |
| 2006/0127765 | A1 | 6/2006 | Machida et al. |
| 2006/0172187 | A1 | 8/2006 | Ambrosio et al. |
| 2009/0274952 | A1 | 11/2009 | Wood et al. |
| 2009/0325054 | A1 | 12/2009 | Payne et al. |
| 2010/0055556 | A1 | 3/2010 | Meschter |
| 2010/0136391 | A1 | 6/2010 | Prilutsky et al. |
| 2010/0279152 | A1 | 11/2010 | Payne |
| 2010/0316894 | A1 | 12/2010 | Hermann et al. |
| 2011/0020676 | A1 | 1/2011 | Kurosawa |
| 2011/0097620 | A1 | 4/2011 | Kim |
| 2011/0111273 | A1 | 5/2011 | Okada et al. |
| 2011/0135975 | A1 | 6/2011 | Fuhr et al. |
| 2011/0195284 | A1 | 8/2011 | Yasui et al. |
| 2012/0002338 | A1 | 1/2012 | Smith et al. |
| 2012/0082880 | A1 | 4/2012 | Koetting et al. |
| 2012/0148889 | A1 | 6/2012 | Fuhr et al. |
| 2012/0231306 | A1 | 9/2012 | Herron et al. |
| 2013/0034755 | A1 | 2/2013 | Kim |
| 2013/0078488 | A1 | 3/2013 | Nemoto et al. |
| 2013/0295428 | A1* | 11/2013 | Hatta ............... H01M 10/658 429/99 |
| 2013/0302664 | A1 | 11/2013 | Millon |
| 2014/0023906 | A1 | 1/2014 | Hashimoto et al. |
| 2014/0162107 | A1 | 6/2014 | Obrist et al. |
| 2014/0302368 | A1 | 10/2014 | Wang et al. |
| 2014/0318106 | A1 | 10/2014 | Mizuno et al. |
| 2014/0329121 | A1 | 11/2014 | Nishihara |
| 2014/0363720 | A1 | 12/2014 | Ackermann et al. |
| 2015/0194711 | A1 | 7/2015 | Rawlinson |
| 2015/0244036 | A1* | 8/2015 | Lane ............... H01M 10/625 429/120 |
| 2015/0280189 | A1 | 10/2015 | Ohshiba et al. |
| 2016/0020447 | A1 | 1/2016 | Janarthanam et al. |
| 2016/0093931 | A1 | 3/2016 | Rawlinson et al. |
| 2016/0099451 | A1 | 4/2016 | Murai et al. |
| 2016/0197385 | A1* | 7/2016 | Matsumoto ....... H01M 10/0585 429/120 |
| 2016/0218336 | A1 | 7/2016 | Herrmann et al. |
| 2017/0162917 | A1 | 6/2017 | Yu et al. |
| 2018/0138473 | A1 | 5/2018 | Bessho et al. |
| 2019/0157729 | A1 | 5/2019 | Yamashita |
| 2019/0161909 | A1 | 5/2019 | Oikawa et al. |
| 2019/0267682 | A1* | 8/2019 | Seo ............... H01M 10/613 |
| 2020/0144576 | A1 | 5/2020 | Yoshida et al. |
| 2020/0220147 | A1 | 7/2020 | Haino et al. |

FOREIGN PATENT DOCUMENTS

| | | | |
|---|---|---|---|
| CN | 101483227 | A | 7/2009 |
| CN | 101523637 | A | 9/2009 |
| CN | 101627490 | A | 1/2010 |
| CN | 102007619 | A | 4/2011 |
| CN | 102054951 | A | 5/2011 |
| CN | 203871442 | U | 10/2014 |
| CN | 204243106 | U | 4/2015 |
| CN | 105518899 | A | 4/2016 |
| CN | 205177921 | U | 4/2016 |
| CN | 105742535 | A | 7/2016 |
| CN | 105789507 | A | 7/2016 |
| CN | 208585211 | U | 3/2019 |
| DE | 102013015749 | A1 | 3/2015 |
| DE | 102017118519 | A1 | 2/2019 |
| EP | 1091438 | A2 | 4/2001 |
| EP | 2262048 | A1 | 12/2010 |
| EP | 2320493 | A1 | 5/2011 |
| JP | 2011175844 | A | 9/2011 |
| JP | 2015002166 | A | 1/2015 |
| WO | 2011134815 | A1 | 11/2011 |
| WO | 2011134828 | A1 | 11/2011 |
| WO | 2017017913 | A1 | 2/2017 |
| WO | 2018022964 | A1 | 2/2018 |
| WO | 2018023050 | A1 | 2/2018 |
| WO | 2018207608 | A1 | 11/2018 |
| WO | 2020134054 | A1 | 7/2020 |

OTHER PUBLICATIONS

U.S. Appl. No. 15/703,114, "Final Office Action", dated Mar. 16, 2020, 22 pages.

U.S. Appl. No. 15/794,200, "Non-Final Office Action", dated Mar. 19, 2020, 23 pages.

U.S. Appl. No. 15/885,126, "Final Office Action", dated Sep. 3, 2020, 14 pages.

Klambauer, et al., "cn.MOPS: Mixture of Poissons for Discovering Copy Number Variations in Next-Generation Sequencing Data with a Low False Discovery Rate", Nucleic Acids Research, vol. 40, No. 9, Feb. 1, 2012, pp. 1-14.

PCT/US2017/044316, "International Preliminary Report on Patentability", dated Feb. 7, 2019, 7 pages.

PCT/US2017/044316, "International Search Report and Written Opinion", dated Nov. 15, 2017, 10 pages.

PCT/US2017/044474, "International Preliminary Report on Patentability", dated Feb. 7, 2019, 9 pages.

PCT/US2017/044474, "International Search Report and Written Opinion", dated Oct. 24, 2017, 12 pages.

U.S. Appl. No. 15/794,200, "Notice of Allowance", dated Oct. 29, 2020, 8 pages.

U.S. Appl. No. 16/259,584, "Non-Final Office Action", dated Nov. 10, 2020, 16 pages.

U.S. Appl. No. 15/703,114, "Non-Final Office Action", dated Aug. 22, 2019, 20 pages.

U.S. Appl. No. 15/885,126, "Non-Final Office Action", dated Aug. 10, 2021, 15 pages.

China Patent Application No. 201910307710.1, "Office Action", dated Jul. 26, 2021, 17 pages.

U.S. Appl. No. 16/259,440, "Non-Final Office Action", dated Mar. 19, 2021, 12 pages.

U.S. Appl. No. 16/259,584, "Final Office Action", dated Jun. 7, 2021, 13 pages.

China Patent Application No. 201910339097.1, "Office Action", dated Jun. 29, 2021, 12 pages.

U.S. Appl. No. 17/175,270, Non-Final Office Action, dated Mar. 17, 2022, 11 pages.

U.S. Appl. No. 15/703,114, Non-Final Office Action, dated Dec. 17, 2021, 24 pages.

U.S. Appl. No. 15/885,126, Final Office Action, dated Jan. 6, 2022, 15 pages.

U.S. Appl. No. 16/259,440, "Notice of Allowability", dated Dec. 9, 2021, 2 pages.

U.S. Appl. No. 16/259,440, Notice of Allowance, dated Dec. 2021, 7 pages.

U.S. Appl. No. 16/259,584, Notice of Allowance, dated Dec. 10, 2021, 12 pages.

U.S. Appl. No. 16/711,829, Non-Final Office Action, dated Feb. 4, 2022, 19 pages.

Application No. PCT/US2021/053553, International Search Report and Written Opinion, dated Jan. 20, 2022, 12 pages.

Final Office Action issued in U.S. Appl. No. 15/703,114, dated Aug. 11, 2022 in 22 pages.

Advisory Action issued in U.S. Appl. No. 15/885,126, dated Apr. 15, 2022 in 4 pages.

Final Office Action issued in U.S. Appl. No. 16/711,829, dated Jul. 28, 2022 in 24 pages.

Notice of Allowance issued U.S. Appl. No. 17/175,270, dated Jun. 28, 2022 in 8 pages.

Office Action issued in China Application No. CN201910307710.1, dated Mar. 2, 2022 in 20 pages.

(56) References Cited

OTHER PUBLICATIONS

Office Action issued in China Application No. CN201910339097.1, dated Jun. 24, 2022 in 10 pages.
Office Action issued in China Application No. CN201910339097.1, dated Apr. 12, 2022 in 17 pages.

* cited by examiner

BATTERY PACK HEAT DISPENSING SYSTEMS

CROSS-REFERENCE TO RELATED APPLICATION

This application claims the benefit of U.S. Application Ser. No. 62/625,579, filed Feb. 2, 2018, the disclosure of which is hereby incorporated by reference in its entirety for all purposes.

TECHNICAL FIELD

The present technology relates to battery structures and systems. More specifically, the present technology relates to methods of configuring and coupling batteries within a pack.

BACKGROUND

Battery placement within a battery pack may be performed with many considerations. For example, battery configurations with compact placement of battery cells may provide increased energy density by allowing more battery cells within the pack. However, tight cell placement may impact heat dissipation from the cells.

SUMMARY

Battery packs according to some embodiments of the present technology may include a first beam and a second beam. The battery packs may include a plurality of cell blocks disposed between the first beam and the second beam. Each cell block of the plurality of cell blocks may include at least two battery cells. The plurality of cell blocks may include a first cell block characterized by a first side surface proximate the first beam, a second side surface, a third side surface proximate the second beam, and a fourth side surface opposite the second side surface. The plurality of cell blocks may also include a second cell block adjacent the first cell block, the second cell block characterized by a first side surface proximate the first beam, a second side surface, a third side surface proximate the second beam, and a fourth side surface opposite the third side surface. The battery packs may include a first interface material thermally coupling the first side surface of the first cell block with the first longitudinal beam. The battery packs may also include a second interface material thermally coupling the third side surface of the second cell block with the second beam.

In some embodiments, the battery packs may also include a lateral wall extending from the first beam to the second beam between the first cell block and the second cell block. The battery packs may include an insulative material extending about the first cell block along at least one of the second side surface of the first cell block, the third side surface of the first cell block, and the fourth side surface of the first cell block. The battery packs may include the insulative material extending about the second cell block along at least one of the first side surface of the second cell block, the second side surface of the second cell block, and the fourth side surface of the second cell block. The insulative material may be characterized by a thermal conductivity less than 0.5 W/m·K. The first interface material and the second interface material may be characterized by a thermal conductivity greater than 0.5 W/m·K. The first cell block may be laterally offset towards the first beam from a center longitudinal axis between the first beam and the second beam, and the second cell block may be laterally offset towards the second beam from the center longitudinal axis.

Embodiments of the present technology may also encompass battery packs including a first cell block including a first battery cell. The first cell block may be characterized by a first side surface, a second side surface, a third side surface opposite the first side surface, and a fourth side surface opposite the second side surface. The battery packs may include a second cell block adjacent the first cell block along the third side surface of the first cell block. The second cell block may include a second battery cell, and the second cell block may be characterized by a first side surface, a second side surface, a third side surface opposite the first side surface, and a fourth side surface opposite the second side surface. The battery packs may include a third cell block adjacent the second cell block along the third side surface of the second cell block. The third cell block may include a third battery cell, and the third cell block may be characterized by a first side surface, a second side surface, a third side surface opposite the first side surface, and a fourth side surface opposite the second side surface. The battery packs may also include a bypass busbar extending from the first cell block to the third cell block. The bypass busbar may electrically couple the first battery cell with the third battery cell. The bypass busbar may extend across the second cell block and may be electrically isolated from the second battery cell.

In some embodiments, the bypass busbar may extend through a first bulkhead separating the first cell block from the second cell block and may extend through a second bulkhead separating the second cell block from the third cell block. The battery packs may also include a gasket positioned in an aperture of each of the first bulkhead and the second bulkhead through which the bypass busbar extends. The gaskets may isolate the bypass busbar from the first bulkhead and the second bulkhead. The second cell block may include at least two second battery cells electrically coupled together with an internal busbar at cell terminals of the at least two second battery cells proximate the second side surface of the second cell block. The bypass busbar may electrically couple a terminal of the first battery cell and a terminal of the third battery cell. The terminal of the first battery cell and the terminal of the third battery cell may each be proximate the respective second surface of the first cell block and the third cell block. The bypass busbar may extend across the second cell block along a substantially similar plane as the internal busbar at a location distal the second surface of the second cell block from the internal busbar.

The bypass busbar may include a bypass section. The bypass busbar may include a first terminal section positioned at a first end of the bypass section and coupled with the terminal of the first battery cell. The bypass busbar may include a second terminal section positioned at a second end of the bypass section opposite the first end and coupled with the terminal of the third battery cell. The first terminal section and the second terminal section may extend by arcuate portions of the first terminal section and the second terminal section from a first plane to a second plane vertically offset from the first plane. The arcuate portions of the first terminal section and the second terminal section may define an arc of about 180°. The bypass section may extend across the cell terminals of the at least two second battery cells of the second cell block.

In some embodiments the bypass busbar may include a bypass section. The bypass busbar may include a first terminal section positioned at a first end of the bypass section and coupled with the terminal of the first battery cell. The bypass busbar may include a second terminal section positioned at a second end of the bypass section opposite the first end and coupled with the terminal of the third battery cell. The bypass section may extend along a plane substantially orthogonal to a plane across the first terminal section and the second terminal section. An insulation material may be positioned along the second side surface of the second cell block, and the insulation material may be positioned between the second cell block and the bypass section of the bypass busbar. The bypass section of the bypass busbar may extend through bulkheads separating the second cell block from the first cell block and the third cell block. The bulkheads may extend laterally beyond the second side surface of the second cell block.

The battery packs may also include a first beam positioned along the second side surfaces of each of the first cell block, the second cell block, and the third cell block. The battery packs may include a second beam positioned along the fourth side surfaces of each of the first cell block, the second cell block, and the third cell block. The battery packs may include a first thermal interface material coupling the second side surface of the first cell block with the first beam. The battery packs may include a second thermal interface material coupling the fourth side surface of the second cell block with the second beam. The battery packs may also include a third thermal interface material coupling the second side surface of the third cell block with the first beam. The first cell block and the third cell block may each be laterally offset towards the first beam from an axis between the first beam and the second beam. The axis may be parallel to the first beam and the second beam and centered between the first beam and the second beam. The second cell block may be laterally offset towards the second beam from the axis.

Such technology may provide numerous benefits over conventional technology. For example, the present systems may reduce heat transfer between adjacent cells during operating and abuse conditions. Additionally, the present systems may improve component insulation to reduce or limit additional conduction paths between cells. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Battery packs may include any number of battery cells packaged together to produce an amount of power. For example, many rechargeable batteries may include multiple cells having any number of designs including wound, stacked, prismatic, as well as other configurations. The individual cells may be coupled together in a variety of ways including series connections and parallel connections. As increased capacity is sought from smaller form factors, battery cell configuration and packaging may play an important role in operation of the battery system under normal operating conditions as well as during abuse conditions.

For example, cell damage may lead to short circuiting in some battery cell designs, which may cause temperature increases initiating exothermic reactions leading to thermal runaway. These events may generate temperatures of several hundred degrees over a period of time that may be seconds, minutes, or more depending on the size and capacity of the cell. Thermal runaway may occur when internal temperatures within a battery cell exceed a threshold temperature whether damage has occurred within the cell or not. Regardless of the initiation mechanism, once begun, the result is often continuous heat generation until reactions have consumed the cell material. When battery cells are placed within a pack design, adjacent cells may be exposed to high temperatures from neighboring cells undergoing failure events. Should this exposure occur over a sufficient time period, the internal temperature within the adjacent cell may exceed the threshold for thermal runaway, extending the failure to the adjacent cell. This process may then continue across each cell within the pack eventually consuming the majority of cells, if not every cell.

Conventional cells have attempted to control failure spread of this nature by isolating cells, incorporating extensive insulation, or increasing the separation of cells from one another. Although this may provide additional protection from cell failure spreading to adjacent cells, this may also limit capacity of a battery pack below some system requirements. The present technology overcomes these issues by creating systems that allow heat produced in one cell to be spread more efficiently through a pack than simply to adjacent cells. By providing additional heat transfer systems within a battery pack, some embodiments of the present technology may allow a more compact and robust design compared to conventional systems.

Although the remaining portions of the description will routinely reference lithium-ion or other rechargeable batteries, it will be readily understood by the skilled artisan that the technology is not so limited. The present techniques may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

Figure 1:
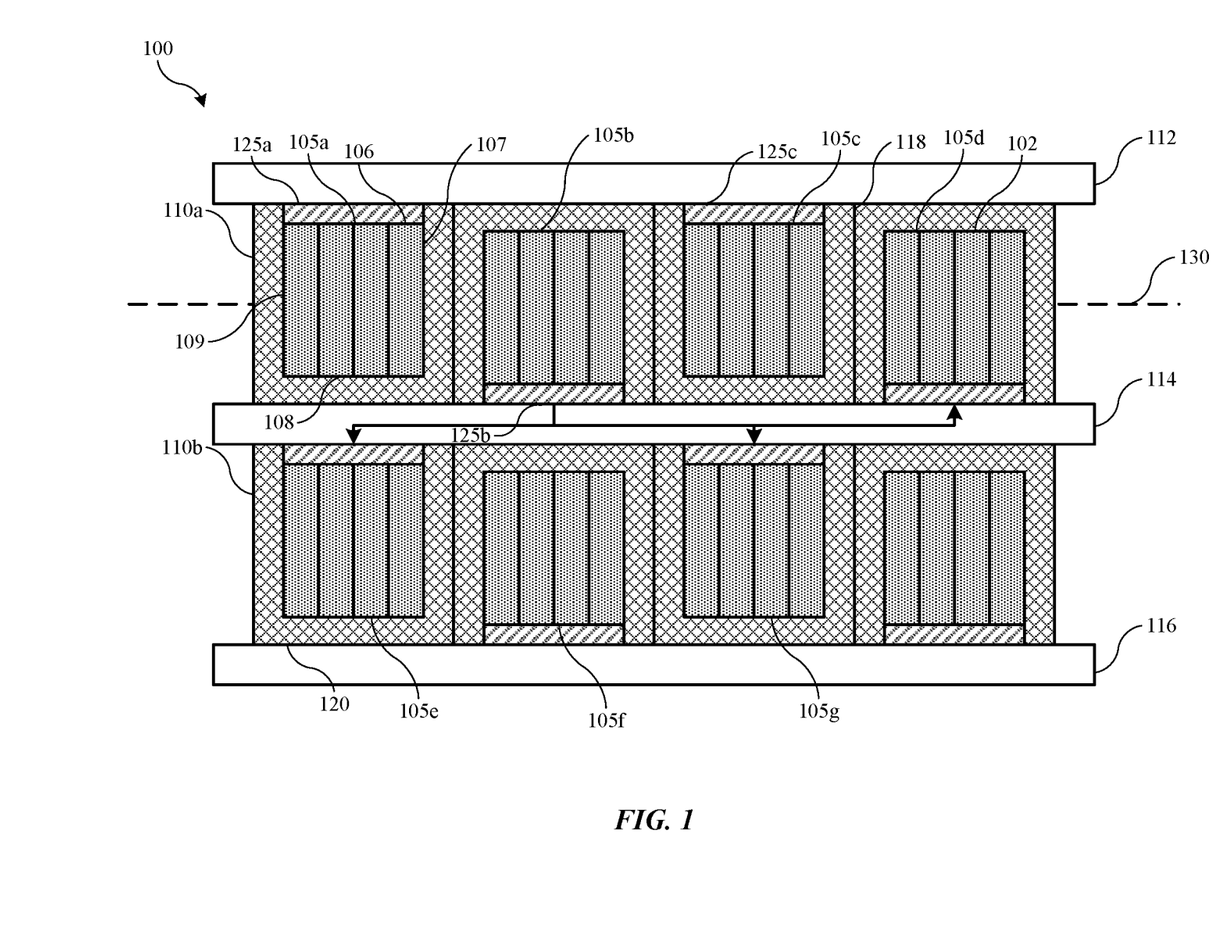
FIG. 1 shows a schematic top view of a battery pack according to some embodiments of the present technology.

FIG. 1 shows a schematic top view of a battery pack 100 according to some embodiments of the present technology. Battery pack 100 includes a number of cell blocks 105 distributed in rows, with each row defining a battery module 110. The battery modules 110a, 110b may be separated from one another by beams, including longitudinal beam 112, longitudinal beam 114, and longitudinal beam 116. The longitudinal beams may support the weight of each battery module 110, and may also provide heat dissipation for cell blocks within each module. As illustrated, battery pack 100 includes two battery modules 110, each including four cell blocks 105. It is to be understood that battery pack 100 may include any number of modules within the pack, and each module may include any number of cell blocks to produce a battery pack of any dimension.

The cell blocks 105 within each module may include one or more battery cells. The battery cells may be rechargeable cells, such as lithium-ion battery cells, although any battery cells or energy storage devices may be used in battery packs according to some embodiments of the present technology. Each cell block 105 is illustrated as including four battery cells 102, although it is to be understood that each cell block may include more or less cells. For example, each cell block may include one or more battery cells included within each block, and may include at least two battery cells, at least four battery cells, at least six battery cells, or more. The individual battery cells 102 may be electrically coupled together in series or parallel, for example. Similarly, the cell blocks 105 may be electrically coupled together in series or parallel, or any other electrical configuration. Cell and cell block electrical coupling for various embodiments will be discussed further below.

The cell blocks 105 may be characterized by a number of side surfaces depending on the geometry of the cells. FIG. 1 illustrates rectangular cell blocks within battery pack 100, although other geometries and configurations are also encompassed. As illustrated, each cell block 105 may be characterized by side surfaces in reference to the longitudinal beams. For example, with reference to cell block 105a, the block may be characterized by a first side surface 106 proximate first longitudinal beam 112. Cell block 105a may be characterized by a second side surface 107 extending laterally between the first longitudinal beam 112 and the second longitudinal beam 114. Second side surface 107 may also be adjacent a cell block 105b. Cell block 105a may further be characterized by a third side surface 108 proximate the second longitudinal beam 114, as well as a fourth side surface 109 opposite second side surface 107. Each cell block 105 may be separated from an adjacent cell block by a lateral wall 118 extending from one longitudinal beam to another longitudinal beam.

The longitudinal beams may be made of any number of materials, and may act as structural members of the battery pack 100. Accordingly, the longitudinal beams may be or include aluminum, steel, plastic materials, or composite materials providing some balance between strength, rigidity, and flexibility. The longitudinal beams may also provide an amount of heat conduction away from battery cell blocks that are in fault or other abuse conditions, including thermal runaway. Each cell block 105 may be at least partially surrounded on one or more sides by insulation 120. Insulation 120 may be included to reduce or limit heat transfer between adjacent cell blocks, although in embodiments an amount of heat transfer may still occur.

In one non-limiting example intended merely as illustration of heat transfer situations within a battery pack, battery cell blocks operating under normal conditions may be operating at internal cell temperatures between about 50° C. and about 150° C., depending on many factors including cell materials, environmental conditions, and cell operating conditions. A cell may enter thermal runaway when internal temperatures rise to temperatures that may exceed a threshold between about 150° C. and about 250° C., again depending on a variety of factors. Once a cell enters thermal runaway, internal temperatures may peak over 400° C. or more. The event leading to thermal runaway may be any number of situations including an internal or external short circuit, which may be caused by many conditions, as well as pack or cell temperatures exceeding the threshold for a sufficient period of time to initiate thermal runaway.

The amount of heat generated may be sufficient to initiate thermal runaway from each cell 102 within the cell block 105. Insulation 120 may contain dissipation of heat from the cell block failure to some extent, however, an amount of heat may be transferred to adjacent cell blocks as well as to longitudinal beams on each side of the cell block. The amount of heat generated may increase the local temperature of each component, and depending on the extent of heat generation, the temperature increase may be 50° C. or more. During thermal runaway events the heat generation may be rapid, which may increase the temperatures of adjacent components quickly. The longitudinal beams may be capable of dissipating an amount of heat from a failing cell block, however the heat generation may be sufficiently rapid that adjacent cells are exposed to an amount of heat to increase cell block temperatures significantly. This increase may exceed the extent to which the longitudinal beams may dissipate the generated heat, which may lead to thermal runaway in the adjacent cell blocks as well.

In many conventional designs, insulation may be provided along all sides of each cell block to assist in controlling heat dissipation to adjacent cells. However, because of the rapid generation of heat during failure events, the heat transferred to adjacent cells may still be sufficient to raise internal temperatures of the adjacent cells above the threshold to initiate thermal runaway in the adjacent cells as well. Because of the insulation extending around the cells, the distribution of heat to the immediately adjacent cells may be substantially uniform, and the amount of heat generated in thermal runaway may cause internal temperatures of each adjacent cell to increase above the thermal runaway threshold. Consequently, many conventional designs may be limited to less compact configurations incorporating additional and thicker insulation 120.

Embodiments of the present technology, including as illustrated in FIG. 1, may allow for more compact configurations by increasing the amount of heat transfer to longitudinal beams. This may facilitate transfer to a greater portion of the battery pack by extending heat transfer to cell blocks that are not immediately adjacent a cell block undergoing thermal runaway. For example, in addition to insulation 120, each cell block may include a thermal interface material 125 along one surface of the cell block to increase heat transfer to a longitudinal beam. Moreover, the thermal interface material 125 may be incorporated to alternate heat transfer between longitudinal beams for adjacent cells, which may limit additional heat transfer to adjacent cells.

As illustrated, thermal interface material 125*a* may be coupled with the first side surface 106 of cell block 105*a*, which may increase heat transfer to longitudinal beam 112. Additionally, in adjacent cell block 105*b*, thermal interface material 125*b* may be coupled with the third side surface of the cell block 105*b*, which may increase heat transfer to longitudinal beam 114. Additionally, insulation 120 may extend about the other side surfaces of each cell block. In this way, for example, cell block 105*b* may be less likely to receive additional heat transfer into the cell block from longitudinal beam 112, to which cell block 105*a* may transfer additional heat load during fault conditions. Cell block 105*c* may also include a thermal interface material 125*c* coupled with the first side surface of cell block 105*c*, which may increase heat transfer to longitudinal beam 112. This coupling may also increase an amount of heat received into cell block 105*c* from other cell blocks thermally connected with the longitudinal beam 112, including cell block 105*a*. Thus, in some embodiments one of the first side surface or the third side surface of each cell block may be coupled with a thermal interface material 125 configured to increase heat transfer to a longitudinal beam, while each other side surface may have an insulation 120 disposed adjacent the surfaces to reduce or limit heat transfer in other directions and to other components.

An example of a cell block failure may further aid understanding of some of the benefits of the present technology. It is to be understood that the following example is not intended to limit any aspect of the present technology, but is intended merely to illustrate some of the benefits of embodiments of the present technology. Due to puncture, or some other event that may cause failure of a cell, cell block 105*b* may enter thermal runaway, generating an amount of heat. Each other cell of the battery pack 100 may be operating normally, and may be operating at a temperature of about 100° C., for example. In conventional designs, cell blocks 105*a* and 105*c*, along with longitudinal beams 112, 114, may receive the majority of the heat produced, which may raise the temperature of cell blocks 105*a* and 105*c* above the threshold for thermal runaway, such as by raising the temperature of each block by 100° C. or more. However, cell block 105*b* in embodiments of the present technology includes thermal interface material 125*b* providing thermal transfer to longitudinal beam 114. As illustrated, each of cell blocks 105*a*, 105*c*, and 105*f* are insulated from longitudinal beam 114, to limit additional heat transfer into the cell blocks.

Each of cell blocks 105*a* and 105*c*, as well as 105*f* to a lesser extent due to interposed longitudinal beam 114, may still be exposed to an amount of heat generated by failing cell block 105*b*. However, the thermal coupling of cell 105*b* may increase distribution of heat along longitudinal beam 114 to additional cell blocks that may also be thermally coupled with longitudinal beam 114. For example, alternating cell blocks may be thermally coupled with each longitudinal beam in each module, which allows heat transferred to longitudinal beam 114 to be at least partially absorbed into cell blocks 105*d*, 105*e*, and 105*g*, as illustrated by the transfer lines included in the figure.

By allowing heat distribution into additional cell blocks, the amount of heat absorbed by cell blocks 105*a* and 105*c* may be reduced. Accordingly, the temperature rise within cell blocks 105*a* and 105*c* may be reduced by at least about 10° C. in some embodiments, and may be reduced by at least about 15° C., at least about 20° C., at least about 25° C., at least about 30° C., at least about 35° C., at least about 40° C., at least about 45° C., at least about 50° C., or higher. The temperature rise in any of the other cells thermally coupled with longitudinal beam 114 may be less than the amount reduced from each of cell blocks 105*a* and 105*c*, and the temperature rise may be any of the temperature ranges noted above. For example, the temperature reduction in cell blocks 105*a* and 105*c* may be at least about 20° C., while the temperature increase in each of blocks 105*d*, 105*e*, and 105*g* may be less than about 20° C.

The thermal insulation 120 may be intended to reduce heat transfer, and may be characterized by a thermal conductivity of less than or about 0.5 W/m·K, and may be characterized by a thermal conductivity of less than or about 0.4 W/m·K, less than or about 0.3 W/m·K, less than or about 0.2 W/m·K, less than or about 0.1 W/m·K, less than or about 0.05 W/m·K, or less. The thermal insulation 120 may be or include any number of insulative materials, and may include thermally resistive blankets, mats, and other materials that may include oxides of various metals, as well as other insulative materials that may contribute to any of the thermal conductivity numbers stated. Because of the distribution of heat away from adjacent cells, the present technology may facilitate a reduction in insulation between cells. For example, in some embodiments the amount of insulation provided about each side surface of a cell block may be less than or about 2 cm in thickness, and may be less than or about 1 cm, less than or about 8 mm, less than or about 6 mm, less than or about 5 mm, less than or about 4 mm, less than or about 3 mm, less than or about 2 mm, or less in some embodiments. The reduced insulation may contribute additional volume in a battery pack, which may be used to incorporate additional or larger battery cells increasing overall capacity.

The thermal interface material 125 may be intended to increase heat transfer, and may be characterized by a thermal conductivity of greater than or about 0.5 W/m·K, and may be characterized by a thermal conductivity of greater than or about 1 W/m·K, greater than or about 2 W/m·K, greater than or about 5 W/m·K, greater than or about 10 W/m·K, greater than or about 25 W/m·K, or greater. The thermal interface material 125 may be or include any number of thermally conductive materials, and may include thermal pastes or grease, polymeric, or other conductive materials. In embodiments the thermal interface material 125 may not be electrically conductive, which may cause short circuiting to the longitudinal beam 114, for example. In some embodiments because the surface of the cell block may not be electrically charged, an electrically conductive paste, which may also increase thermal conductivity, may be used. By utilizing the thermal interface material 125 to facilitate heat transfer to additional cells within a module or battery pack, the amount of insulation utilized may be reduced, which again may increase the useable space within a battery pack for cell blocks battery cells.

The configurations of the cell blocks within each module may also be adjusted based on the thermal insulation 120 and the thermal interface material 125. For example, the thermal insulation 120 may be thicker than the thermal interface material 125. In some embodiments, the thickness of the thermal interface material 125 may be limited to ensure a full surface contact between the cell block and the longitudinal beam. The cell blocks 105 may then be laterally offset in some embodiments towards the longitudinal beam with which they are thermally coupled. For example, in some embodiments, each cell block may be laterally offset from an axis parallel to and centered between the beams.

As illustrated in FIG. 1, a center longitudinal axis 130 may exist between longitudinal beam 112 and longitudinal beam 114. Each cell block may be laterally offset from axis 130 towards the longitudinal beam with which it is thermally coupled by thermal insulation material 125. For example, each of cell blocks 105a and 105c are thermally coupled with longitudinal beam 112, and are offset from center longitudinal axis 130 laterally towards longitudinal beam 112. Additionally, each of cell blocks 105b and 105d are thermally coupled with longitudinal beam 114, and are offset from center longitudinal axis 130 laterally towards longitudinal beam 114. Because of the lateral offset, additional thermal insulation 120 may be positioned between each cell block and the opposite longitudinal beam of the longitudinal beam to which the cell block is thermally coupled.

Figure 2:
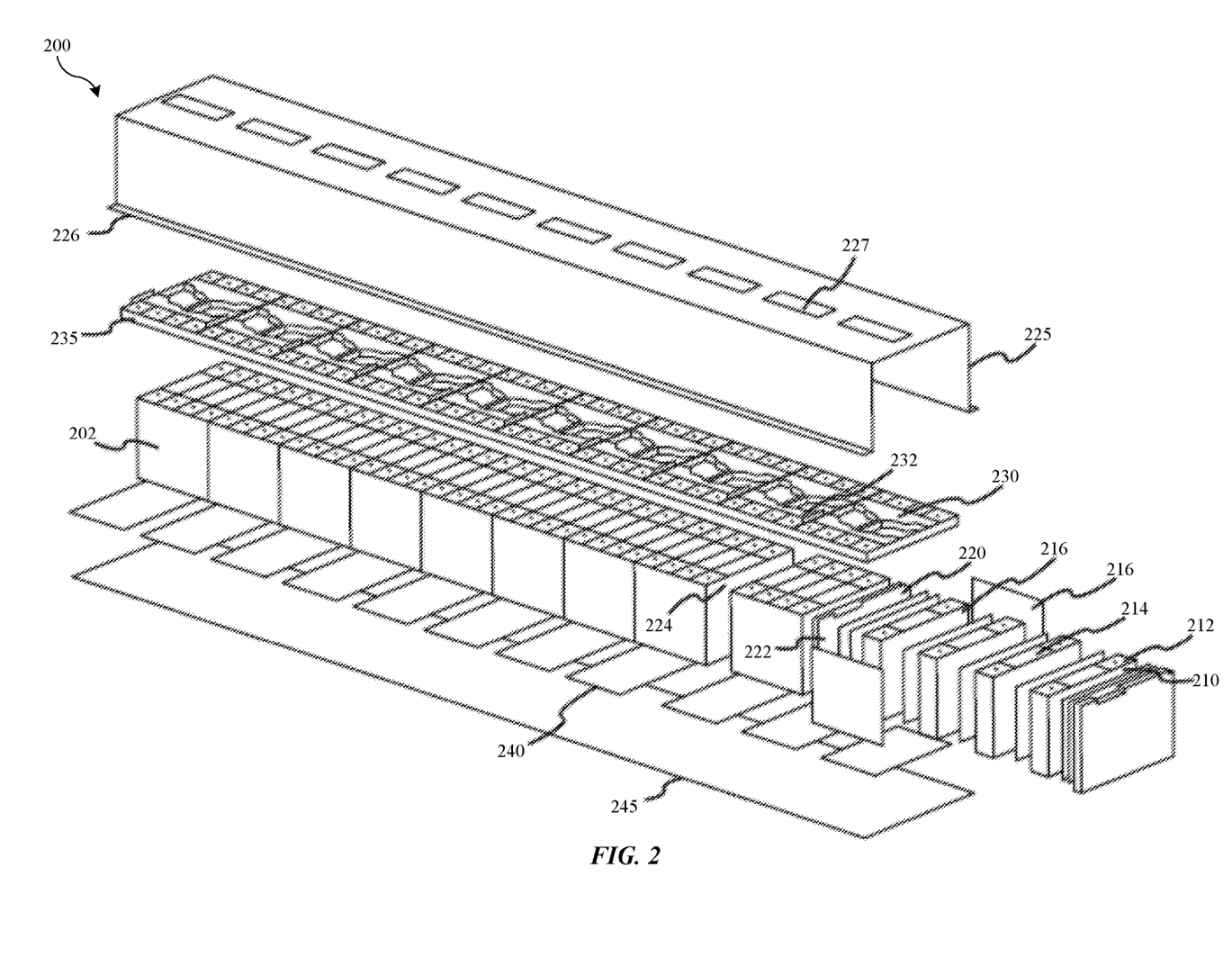
FIG. 2 shows a schematic exploded perspective view of a battery module according to some embodiments of the present technology.

Additional components may contribute to facilitating heat transfer from a failing cell block to additional cell blocks in the battery pack. These components and designs may be used in addition to the components discussed with FIG. 1, as well as alternatively in some embodiments. The following discussion will describe an exemplary battery module that may be included in exemplary battery packs of the present technology, followed by additional components that may be utilized with the exemplary battery modules. FIG. 2 shows a schematic exploded perspective view of a battery module according to some embodiments of the present technology. Battery module 200 may be one of a number of battery modules that may be included within a battery pack, such as battery pack 100 previously described. The battery module 200 may include a number of battery cell blocks 202, which each include one or more battery cells 210. As illustrated, each cell block 202 includes four individual battery cells 210, although it is to be understood that embodiments may include any number of battery cells per battery cell block, such as one cell, at least about two cells, at least about four cells, at least about six cells, or more. Additionally, the battery module 200 may include any number of battery cell blocks within the module based on length of the module, which may be based on one of several lateral dimensions of a battery pack.

Battery cells 210 may be similar to one another or may be different across the cell blocks and module. In embodiments, each battery cell 210 may be a similar battery cell as each other battery cell. Battery cells 210 may be or include prismatic cells, pouch cells, stacked cells, would cells, or any number of other battery cell designs. As shown, a surface of each battery cell 210 may include terminals 212 as well as a cell vent 214 in embodiments. In exemplary battery modules, this may be a top surface of each battery cell 210, or a bottom surface of each battery cell 210.

Each cell block 202 may include a number of battery cells coupled with one another, such as with adhesive, to limit spacing between battery cells. Thermal insulation 216 may be positioned on sides surrounding each cell block 202. Thermal insulation 216 may provide multiple benefits within a battery module. For example, thermal insulation about the sides of each cell block may limit thermal conductivity from one cell block to another. Additionally, thermal insulation 216 may be or include a compressive material to provide accommodation space within each cell block.

As battery cells are cycled during their life, the cells may swell over time. When cells are rigidly compressed or contained within a particular structure, the cells may have reduced cycle life. The present technology, however, may include thermal insulation configured to provide an amount of deflection or compression to accommodate swelling of battery cells over time, as well as to reduce or limit heat transfer between adjacent cell blocks. The thermal insulation 216 may be configured to fully occupy space within each cell block to limit any gaps within the block. However, the thermal insulation material may be configured to accommodate compression of up to or about 50% or more of its thickness to accommodate battery swelling over time. Unlike conventional technology that may not provide such accommodation, the present technology may produce longer battery life cycles based on the incorporated accommodation of battery swelling within each cell block.

Opposite ends of each cell block 202 in an axial direction of battery module 200 may include a bulkhead 220. Bulkhead 220 may be a rigid member separating each cell block 202 from an adjacent cell block. Bulkhead 220 may be aluminum, steel, ceramic, plastic, or any number of other materials to separate cell blocks or contain cell blocks. Bulkheads 220 may include a flange 222, which may facilitate coupling of the bulkhead 220 with a sleeve or shroud 225. Shroud 225 may extend over a number of sides of each cell block 202. For example, shroud 225 may extend about sides and a top or bottom of each cell block in embodiments. Shroud 225 may define or include cell block vents 227, which may communicate with each battery cell vent 214 within the cell block. Shroud 225 may include a cell block vent 227 for each cell block included in module 200, or may include more or fewer vents as there are cell blocks.

Shroud 225 may be welded, bonded, glued, fastened, or otherwise coupled with bulkheads 220 on sides of the module. Flanges 222 of bulkheads 220 may extend as an end joint on the bulkheads 220. The flange may extend back towards the bulkheads 220 in a 180 degree rounded turn, which may provide protection for a weld. During certain welding operations coupling the shroud 225 with the flanges 222 of each bulkhead 220, sputtering may occur through the backside of the flange. By having the flange double back on itself, any sputtering may be contained within a loop formed by the flange. This may limit or prevent any sputtered material from contacting any cells of the cell block. Bulkheads 220 and shroud 225 may provide structural rigidity to the module 200, which may limit vibration effects on the cell blocks 202.

Bulkheads 220 may also define a recess 224 along a surface of the bulkhead 220 in line with terminals 212 of the battery cells 210. Cell blocks 202 may be joined together with busbars 230, 232 in embodiments as will be described further below. Busbars 230 may be intra-cell block busbars that electrically couple individual cells of each cell block 202. Busbars 232 may be inter-cell block busbars or bypass busbars that couple adjacent cell blocks of the modules or alternating cell blocks of the modules. Recess 224, which may be a notch defined in the bulkhead 220, may provide access for busbars 232 to extend from one cell block to another.

Busbars 230, 232 may be seated in a tray positioned between cell blocks 202 and shroud 225. Tray 235 may include features to seat the busbars to ensure proper spacing between cell blocks, and also to electrically insulate the various structures. Busbar tray 235 may define one or more channels or apertures through the busbar tray to allow egress of material from cell vents within each battery cell 210. For example, for battery cells including a centrally located cell vent, busbar tray 235 may include a central channel to provide access to the cell block vents 227 from the cell vents 214.

A thermal interface material 240 may be coupled or placed along a surface of each cell block opposite a surface facing cell block vents 227 of shroud 225. The thermal interface material 240 may be configured to conduct or transfer heat generated from battery cells 210 through a surface of the battery module 200. Thermal interface material 240 may be included in individual sheets that may be placed on a surface of each cell block and may be sized relative to a cell block size, or a length of thermal interface material may be positioned along an axial length of battery module 200.

Battery module 200 may also include a cover 245, which may provide a lid to the battery module 200. Shroud 225 may include a lip or flange 226 on either or both sides of the structure to provide a coupling location for top cover 245. Additionally, flange 226 may be used to seat battery module 200 on longitudinal members, such as the longitudinal beams previously described, when battery module 200 is positioned within a battery pack. Top cover 245 and shroud 225 may be a rigid material in embodiments, and may be aluminum, steel, or some other structural material configured to house and contain cell blocks of a battery module. The top cover and shroud may be configured to control an internal volume of the battery module to limit or prevent effluent egress from the battery module except through cell block vents 227, which may lead into a plenum or other structure of the battery pack.

Figure 3:
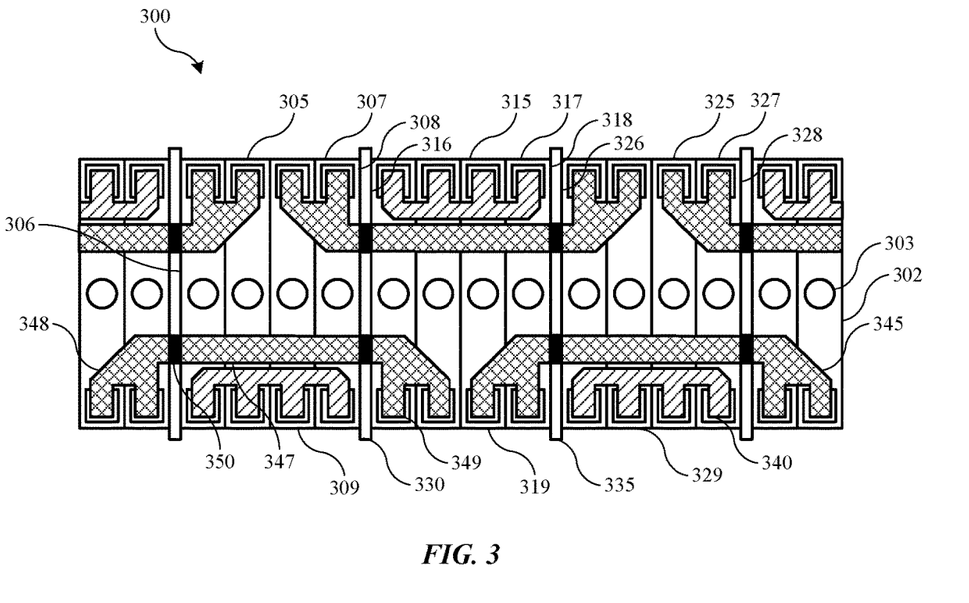
FIG. 3 shows a schematic top view of a portion of a battery module according to some embodiments of the present technology.

FIG. 3 shows a schematic top view of a portion of a battery module 300 according to some embodiments of the present technology. Battery module 300 may include any of the components of battery module 200 discussed above, and may illustrate a partial view of a battery module that may be included within a battery pack as previously described. For example, battery module 300 may include a different detail view of battery pack 100 in some embodiments, and may include any of the additional battery pack components previously described, such as longitudinal beams, insulation, and thermal interface material. Battery module 300 may illustrate three cell blocks included within a module. As previously discussed, any module may include more or less cell blocks. Battery module 300 may include a first cell block 305, a second cell block 315, and a third cell block 325. Each cell block may include one or more battery cells 302, such as any number of cells previously noted, including four cells as illustrated. Each battery cell 302 may include a cell vent 303, which may release pressurized effluents during a failure event, such as thermal runaway.

Each cell block within battery module 300 may be similar to other cell blocks within the battery module, although cell blocks may be laterally offset from adjacent cell blocks as previously discussed. First cell block 305 may be characterized by a first side surface 306, a second side surface 307, a third side surface 308 opposite the first side surface 306, and a fourth side surface 309 opposite the second side surface 307. First cell block 305 may include one or more first battery cells, and in some embodiments may include four first battery cells as illustrated. Second cell block 315 may be positioned adjacent first cell block 305, and may be positioned adjacent the third side surface 308 of first cell block 305. Second cell block 315 may be characterized by a first side surface 316, a second side surface 317, a third side surface 318 opposite the first side surface 316, and a fourth side surface 319 opposite the second side surface 317. Second cell block 315 may include one or more second battery cells, and in some embodiments may include four second battery cells as illustrated. Third cell block 325 may be positioned adjacent second cell block 315, and may be positioned adjacent the third side surface 318 of second cell block 315. Third cell block 325 may be characterized by a first side surface 326, a second side surface 327, a third side surface 328 opposite the first side surface 326, and a fourth side surface 329 opposite the second side surface 327. Third cell block 325 may include one or more third battery cells, and in some embodiments may include four third battery cells as illustrated.

Bulkheads as previously described may be positioned between each cell block to provide structural rigidity to the battery module 300, as well as to isolate each cell block from adjacent cell blocks. The bulkheads may be lateral members that extend between longitudinal beams as previously described. A first bulkhead 330 may be positioned between the third side surface 308 of the first cell block 305 and the first side surface 316 of the second cell block 315. A second bulkhead 335 may be positioned between the third side surface 318 of the second cell block 315 and the first side surface 326 of the third cell block 325.

Battery module 300 may include one or more busbars electrically coupling battery cells within a cell block as well as coupling battery cell blocks to one another. As illustrated, battery module 300 may include internal busbars 340 as well as bypass busbars 345. The number of busbars may depend on the number of cell blocks within a module. Each battery cell 302 within each cell block may include two terminals for electrical coupling, such as, for example, a positive terminal and a negative terminal. Each battery cell 302 within a cell block may be reversed compared to adjacent battery cells so that a positive terminal of one battery cell is adjacent a negative terminal of the next battery cell. The battery cells 302 may be configured to have one terminal positioned adjacent the second side surface of the associated cell block, and the second terminal positioned adjacent the fourth side surface of the associated cell block as illustrated in FIG. 3. By this configuration, battery cells 302 within a cell block may be electrically coupled together utilizing terminals adjacent one side surface of the cell block, while battery cell blocks may be electrically coupled together utilizing terminals adjacent the opposite side surface of the cell block.

Second cell block 315 may include an internal busbar 340 electrically coupling each of the second batteries included within second cell block 315. The second batteries may each be coupled together at cell terminals of the second batteries proximate the second side surface 317 of the second cell block 315. First cell block 305 and third cell block 325 may each also include an internal busbar 340 coupling the first battery cells together and the third battery cells together. As illustrated, the internal busbar for each of the first cell block 305 and the third cell block 325 may couple the individual battery cells at cell terminals of the first batteries and third batteries proximate the fourth side surface 309 of the first cell block 305 and the fourth side surface 329 of the third cell block 325. By alternating the cell terminals of each cell block at which the internal bus bars 340 are connected access for bypass busbars 345 as illustrated may be provided at the remaining exposed terminals.

Bypass busbars 345 may extend over an internal cell block of a group of cell blocks. For example, as illustrated, a bypass busbar 345 extends from the first cell block 305 to the third cell block 325. The bypass busbar couples cell terminals proximate the second surface 307 of the first cell block 305 with cell terminals proximate the second surface 327 of the third cell block 325. Bypass busbar 345 electrically couples the first battery cells in cell block 305 with the third battery cells in cell block 325. Additionally, the bypass busbar extends across the second cell block, and in embodiments may be electrically isolated from the second battery cells in the second cell block 315. In embodiments in which additional cell blocks are included in module 300, the second cell block may be coupled with cell blocks adjacent the first cell block and the third cell block utilizing bypass busbars coupled with cell terminals proximate the fourth side surface of the second cell block as illustrated.

Busbars extending across cell blocks to provide series or parallel electrical coupling may be exposed to effluent materials venting from cell vents 303. This effluent material may be at temperatures of several hundred degrees, and may directly impinge on the busbars in some embodiments. Because the busbars are electrically conductive, in some embodiments the busbars may be thermally conductive as well. Additionally, the busbars may pass through insulation between cells providing a direct conductive path from one cell block to another. In module designs where the bypass busbars electrically couple adjacent battery cell blocks, such as by coupling the first cell block 305 with the second cell block 310, substantial heat transfer may occur along the conductive busbar. Accordingly, by extending the bypass busbars 345 beyond adjacent cell blocks into alternating cell blocks within the battery module, additional heat can be transferred away from a cell block in thermal runaway without directing the full heat load into adjacent cells alone. This may additionally reduce the likelihood of causing chain reactions by which individual cell blocks are triggered into thermal runaway due to an adjacent failing cell block.

Portions of the bypass busbars extending across an adjacent cell block may be further insulated from transferring excess heat into the adjacent cell block. Bulkheads 330, 335 may include apertures or indentations through which the bypass busbars 345 extend. Gaskets 350 may be positioned within each aperture to isolate the bypass busbar from electrically contacting the bulkheads. These gaskets may also provide an amount of thermal insulation between the components to limit or reduce heat transfer from the bypass busbar to the bulkheads 330, 335. Additionally, each bypass busbar 345 may include a bypass section 347, a first terminal section 348, and a second terminal section 349. The first terminal section and the second terminal section may each couple with cell terminals of batteries within cell blocks adjacent opposite sides of an interior cell block, such as cell block 315, for example. Bypass section 347 may extend across the interior cell block without electrically contacting the interior cell block or any of the constituent battery cells. The bypass section 347 may be insulated, such as with an insulative wrapping, to limit radiative heat transfer from the bypass section 347 to the interior cell block battery cells.

FIG. 3 illustrates a first configuration of a bypass busbar 345 in which the bypass busbar 345 may extend across the interior cell block, such as second cell block 315, along a substantially similar plane as the internal busbar 340 utilized to electrically couple the second battery cells within the second cell block 315. For example, first terminal portion 348 and second terminal portion 349 may extend laterally beyond a width of the internal busbar within second cell block 315. Bypass section 347 may then extend across second cell block 315 without contacting internal busbar 340. Thus, where internal busbar 340 may extend proximate the second surface 317 of the second cell block 315, bypass section 347 of bypass busbar 345 may extend distal the second surface 317 of the second cell block 315 relative the internal busbar. By maintaining the bypass section 347 along a similar plane as the internal busbar, bulkheads and other components may not require modification to accommodate additional vertical height of the battery module caused by the bypass busbar.

The bypass section 347 may still be maintained laterally nearer the second surface of the second cell block 315 than the fourth surface 319 of the second cell block 315 in some embodiments. Depending on the location of the cell vents 303 of the battery cells, the bypass section 347 may be maintained laterally offset from the cell vent location to limit the bypass section 347 from being impinged by any effluents exiting cell vents 303 within the interior cell block. Were the bypass section allowed to extend across the cell vents, a failure by the interior cell block being bypassed could cause effluents to be directed at the bypass busbar. If the effluents eroded any insulation material on the bypass section of the busbar, the bypass busbar may provide a path to provide additional heat to the adjacent cell blocks. However, if the bypass section is offset from the direct flow path of the cell vents 303, this scenario may be avoided. It is to be understood that bypass busbars extending proximate the fourth surface of the cell blocks, such as coupled with additional terminals within the second cell block, may similarly be positioned laterally offset towards the fourth surfaces.

Figure 4:
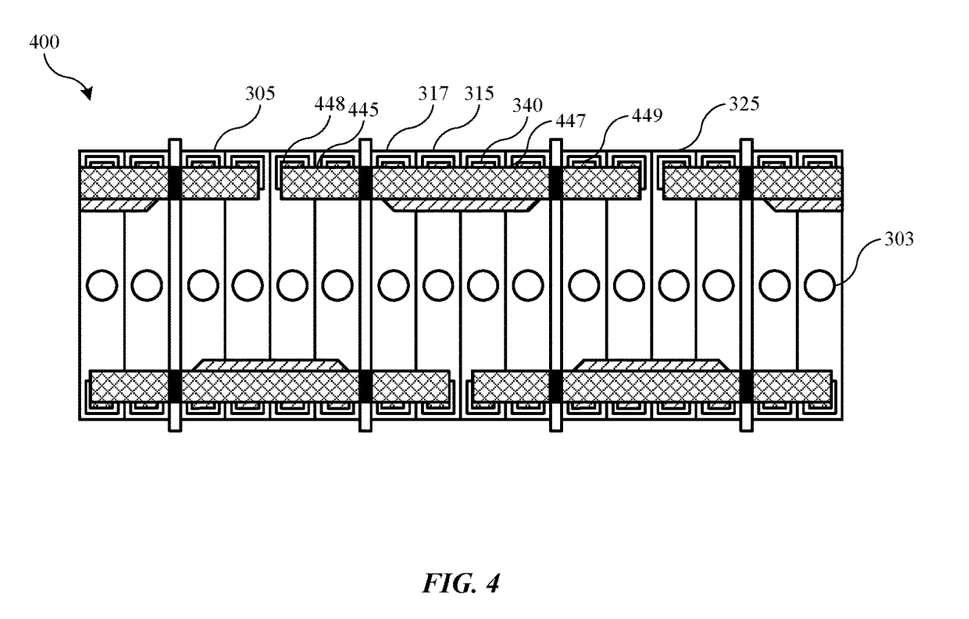
FIG. 4 shows a schematic top view of a portion of a battery module according to some embodiments of the present technology.

FIG. 4 shows a schematic top view of a portion of a battery module 400 according to some embodiments of the present technology. Battery module 400 may include some or all of the components of battery module 300 discussed above, and may show an alternative bypass busbar design. Battery module 400 may include similar internal busbars 340 discussed above, but may include a bypass busbar 445 that extends above internal busbars 340. By extending on a separate plane vertically offset from the internal busbars 340, the bypass busbar may be located nearer the second surface 317 of the second cell block 315. This may allow the bypass section to be laterally offset further from the cell vents 303, to limit contact to the bypass section from effluents escaping the vents of the interior cell block being bypassed.

As illustrated, bypass busbar 445 may include a bypass section 447 extending across second cell block 315 and remaining electrically isolated from second battery cells within second cell block 315. The bypass busbar 445 may include a first terminal section 448 positioned at a first end of the bypass section 447, and coupled with one or more cell terminals within the first cell block 305. The bypass busbar 445 may also include a second terminal section 449 positioned at a second end of the bypass section 447 opposite the first end of the bypass section. The second terminal section 449 may be coupled with one or more cell terminals within the third cell block 325. Bypass busbar 445 may extend from a first plane at which the terminal sections are electrically coupled with the cell terminals of the first and third cell blocks to a second plane, vertically offset from the first plane, at which the bypass section may extend. The first plane may be a plane at which the internal busbar may extend across the cell terminals of battery cells within the second cell block. In some embodiments all cell terminals of every cell block may be located along the same plane across the battery module. By extending across a second plane vertically offset from the first plane, the bypass section may at least partially extend across the cell terminals of the second battery cells within the second cell block as illustrated.

Figure 5:
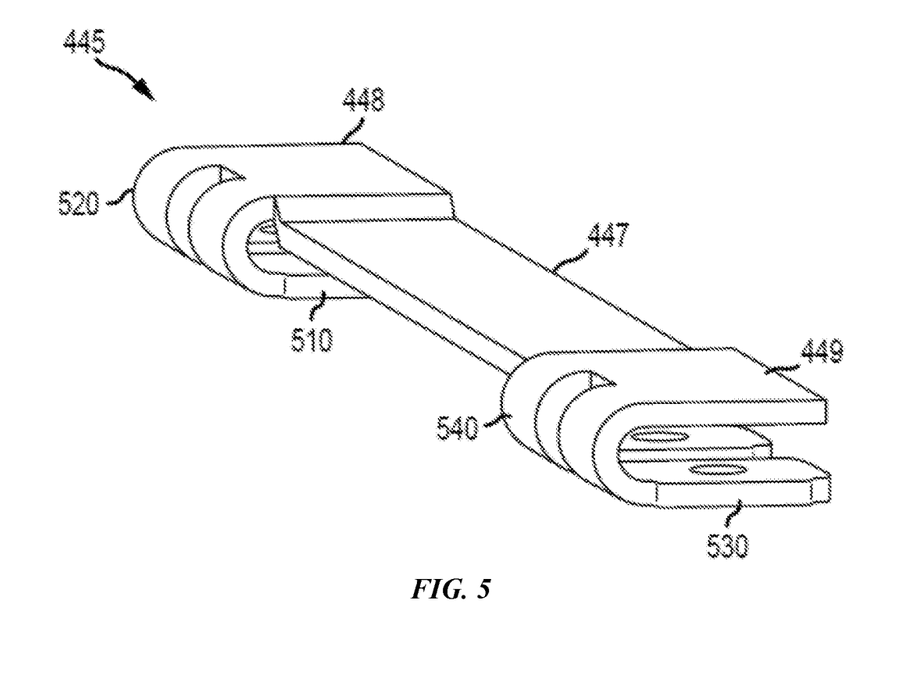
FIG. 5 shows a schematic perspective view of a bypass busbar according to some embodiments of the present technology.

FIG. 5 shows a schematic perspective view of a bypass busbar 445 according to some embodiments of the present technology. The additional view provided by FIG. 5 illustrates the extension of the terminal sections 448, 449 from the first plane at which the terminal sections are electrically coupled with the cell terminals within the first cell block and the third cell block. The first terminal section 448 may extend from a connection portion 510 with which the bypass busbar may be coupled with cell terminals within the first cell block. The first terminal section 448 may then extend by an arcuate portion 520 from the first plane to a second plane vertically offset from the first plane. The bypass section 447 may extend substantially along the second plane to the second terminal section 449.

The second terminal section 449 may extend from the second plane back to the first plane along arcuate portion 540 to a connection portion 530 of the second terminal section. The connection portion 530 may be electrically coupled with the cell terminals within the third cell block. In embodiments the arcuate portions 520, 540 may define an arc from the first plane to the second plane. The arc may be characterized by any angle greater than 0° to about 180° or more. In some embodiments the arcuate portions may define an arc of about 180° as illustrated, which may not be exactly 180° due to machine tolerances as well as packing considerations.

Figure 6:
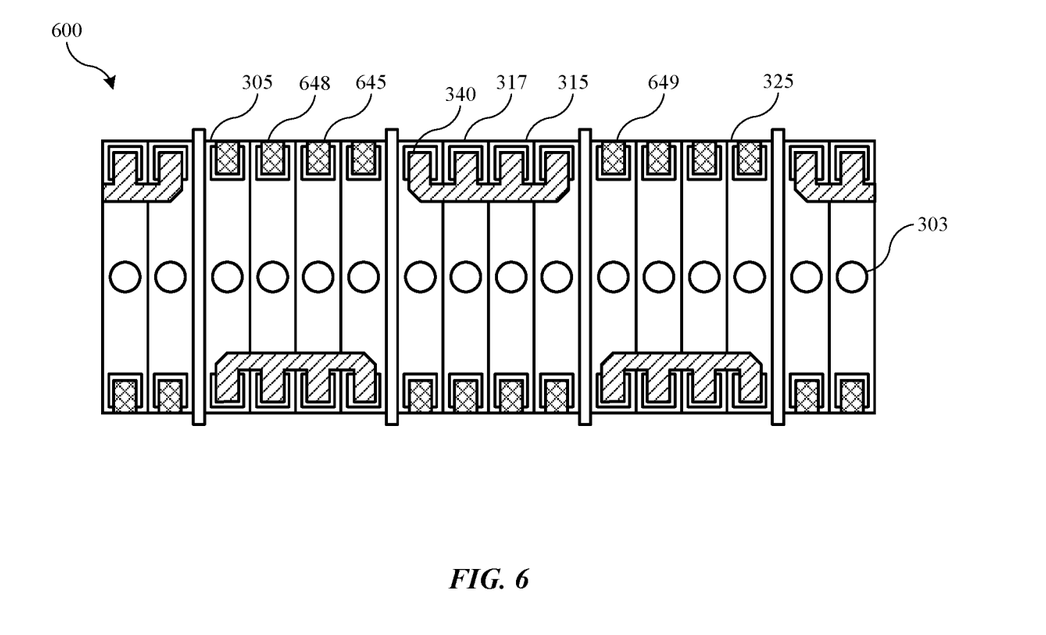
FIG. 6 shows a schematic top view of a portion of a battery module according to embodiments of the present technology.

FIG. 6 shows a schematic top view of a portion of a battery module 600 according to embodiments of the present technology. Battery module 600 may also include some or all of the components of battery module 300 discussed above, and may show an alternative bypass busbar design. Battery module 600 may include similar internal busbars 340 discussed above, but may include a bypass busbar 645 that extends across the second surface 317 of the second cell block 315 along a plane orthogonal to a plane on which the battery cell terminals may be located. By extending the bypass busbar along a side of the second cell block, the bypass busbar may be substantially removed from a volume adjacent the battery cells in which the cell vents 303 may exhaust effluent materials during thermal runaway. This may also provide additional opportunities to limit heat transfer from the bypass busbar into the interior cell block, such as second cell block 315, for example.

As illustrated in FIG. 6, second cell block 315 may include an internal busbar 340 extending across cell terminals of the second battery cells within the second cell block. Bypass busbar 645 may include a first terminal portion 648 positioned at a first end of a bypass section, and coupled with one or more cell terminals within the first cell block 305. The bypass busbar 645 may also include a second terminal section 649 positioned at a second end of the bypass section opposite the first end of the bypass section. The second terminal section 649 may be coupled with one or more cell terminals within the third cell block 325. A bypass section may extend along second surface 317 along an orthogonal plane relative to a plane across first terminal section 648 and second terminal section 649.

Figure 7:
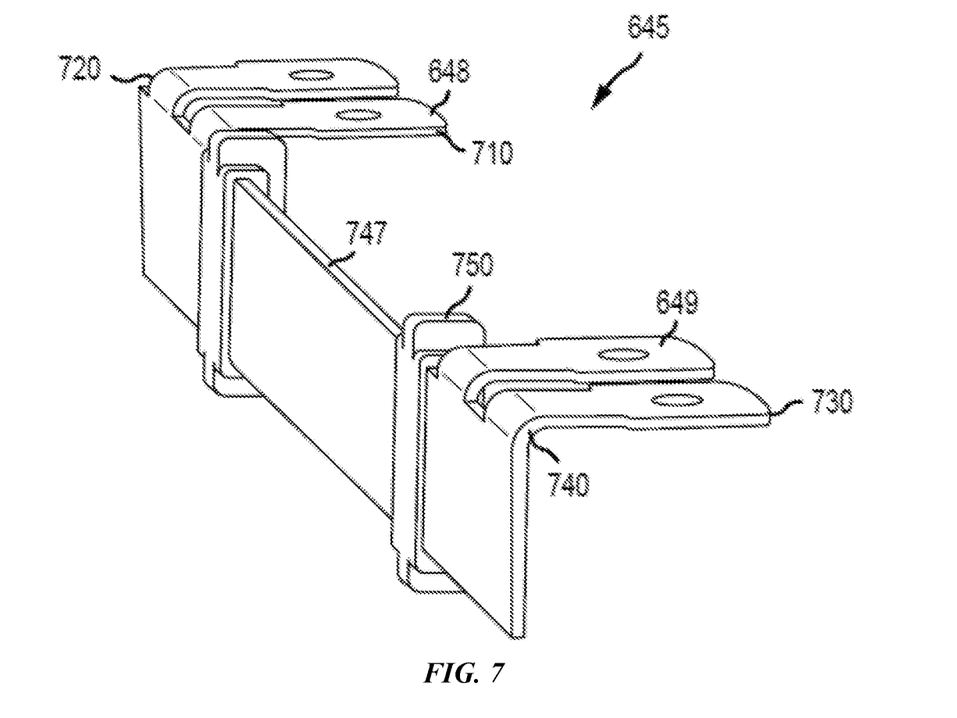
FIG. 7 shows a schematic perspective view of a bypass busbar according to some embodiments of the present technology.

FIG. 7 shows a schematic perspective view of a bypass busbar 645 according to some embodiments of the present technology. The additional view provided by FIG. 7 illustrates the extension of the terminal sections 648, 649 from the first plane at which the terminal sections are electrically coupled with the cell terminals within the first cell block and the third cell block. The first terminal section 648 may extend from a connection portion 710 to which the bypass busbar may be coupled with cell terminals within the first cell block. The first terminal section 648 may then extend about an arcuate portion 720 from the first plane to a second plane substantially orthogonal to the first plane. The bypass section 747 may extend substantially along the second plane, which may extend across the second surface of the second cell block, to the second terminal section 649.

The second terminal section 649 may extend from the second plane back to the first plane along arcuate portion 740 to a connection portion 730 of the second terminal section. The connection portion 730 may be electrically coupled with the cell terminals within the third cell block. In embodiments the arcuate portions 720, 740 may define an arc from the first plane to the second plane, which may be any of the angles previously noted. In some embodiments the arcuate portions may define an arc of about 90° as illustrated, which may not be exactly 90° due to machine tolerances as well as packing considerations. Because the bypass section 747 may extend across the second surface of the second cell block as illustrated in FIG. 6, the bypass section 747 may extend through the bulkheads along a vertical cross-section compared to the previously discussed designs, which may extend through the bulkheads along a horizontal cross-section. Gaskets 750 may be positioned on bypass section 747 where the bypass section may extend through bulkheads between the cell blocks.

Figure 8:
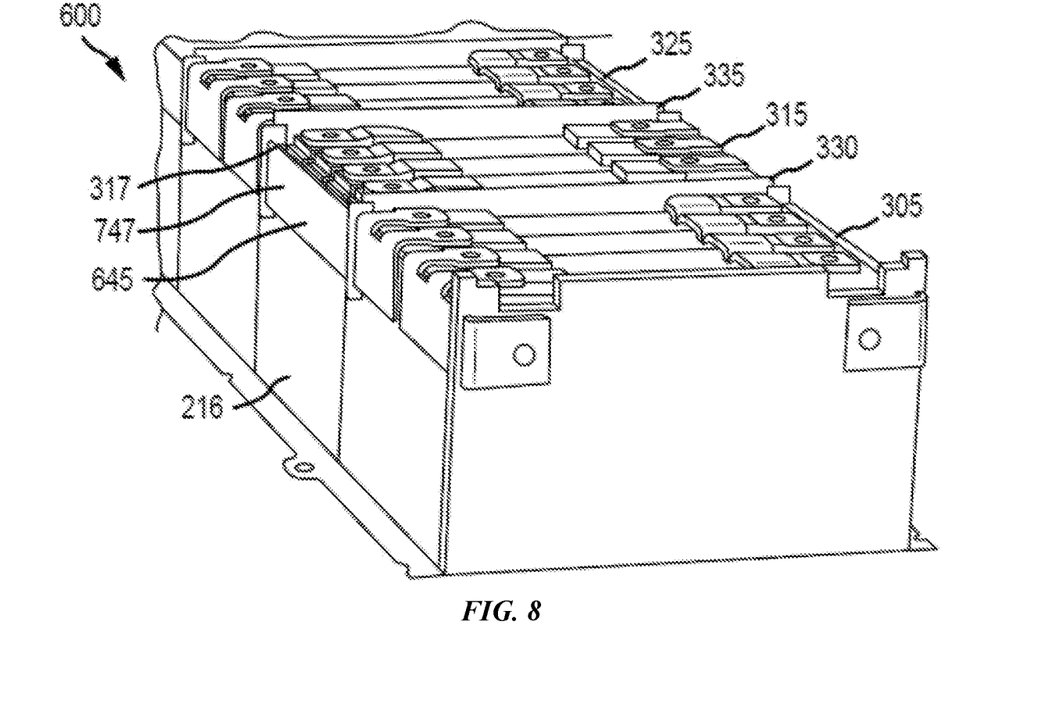
FIG. 8 shows a schematic perspective view of a battery module according to some embodiments of the present technology.

FIG. 8 shows a schematic perspective view of battery module 600 according to some embodiments of the present technology. As noted previously, bypass section 747 of bypass busbar 645 may extend along a vertical surface of the cell block, such as across second surface 317 of second cell block 315. Additionally, FIG. 8 illustrates bypass busbar 645 extending through bulkheads 330, 335 at an exterior vertical edge of the bulkheads. To accommodate this configuration, in some embodiments bulkheads 330, 335 may extend laterally beyond the second side surfaces and the fourth side surfaces of the cell blocks by at least a distance equal to a thickness of the bypass section 747 of the bypass busbar 645. By extending the bypass section 747 of bypass busbar 645 along second surface 317 of second cell block 315, thermal insulation 216, which may be positioned along the second surface of the second cell block 315, may be positioned between second cell block 315 and bypass section 747 of bypass busbar 645. In this way, radiative heat transfer from the bypass busbar into the second cell block 315 may be limited or reduced.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery pack comprising:
   a first beam;
   a second beam;
   a plurality of cell blocks disposed between the first beam and the second beam, wherein each cell block of the plurality of cell blocks comprises at least two battery cells, and wherein the plurality of cell blocks include:
   a first cell block characterized by a first side surface proximate the first beam, a second side surface, a third side surface proximate the second beam, and a fourth side surface opposite the second side surface, and
   a second cell block adjacent the first cell block, the second cell block characterized by a first side surface proximate the first beam, a second side surface, a third side surface proximate the second beam, and a fourth side surface opposite the second side surface;
   a first interface material thermally coupling the first side surface of the first cell block with the first beam;
   a first insulative material in contact with the third surface of the first cell block and thermally insulating the third surface of the first cell block from the second beam;
   a second interface material thermally coupling the third side surface of the second cell block with the second beam; and
   a second insulative material in contact with the first surface of the second cell block and thermally insulating the first surface of the second cell block from the first beam.

2. The battery pack of claim 1, further comprising a lateral wall extending from the first beam to the second beam between the first cell block and the second cell block.

3. The battery pack of claim 1, wherein the first insulative material extends about the first cell block along each of the second side surface of the first cell block, the third side surface of the first cell block, and the fourth side surface of the first cell block.

4. The battery pack of claim 3, wherein the second insulative material extends about the second cell block along each of the first side surface of the second cell block, the second side surface of the second cell block, and the fourth side surface of the second cell block.

5. The battery pack of claim 4, wherein the insulative material is characterized by a thermal conductivity less than 0.5 W/m·K.

6. The battery pack of claim 1, wherein the first interface material and the second interface material are characterized by a thermal conductivity greater than 0.5 W/m·K.

7. The battery pack of claim 1, wherein the first cell block is laterally offset towards the first beam from a center longitudinal axis between the first beam and the second beam, and wherein the second cell block is laterally offset towards the second beam from the center longitudinal axis.

* * * * *